(12) United States Patent
Rahle et al.

(10) Patent No.: US 9,372,589 B2
(45) Date of Patent: Jun. 21, 2016

(54) STRUCTURED INFORMATION ABOUT NODES ON A SOCIAL NETWORKING SYSTEM

(75) Inventors: Bruno Rahle, Zagreb (HR); Blaise DiPersia, Palo Alto, CA (US); Rousseau Kazi, Moreno Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 738 days.

(21) Appl. No.: 13/450,269

(22) Filed: Apr. 18, 2012

(65) Prior Publication Data
US 2013/0282486 A1 Oct. 24, 2013

(51) Int. Cl.
G06Q 30/02 (2012.01)
G06F 15/16 (2006.01)
G06F 3/048 (2013.01)
G06Q 50/00 (2012.01)
G06F 17/30 (2006.01)

(52) U.S. Cl.
CPC .............. *G06F 3/048* (2013.01); *G06Q 30/02* (2013.01); *G06Q 50/01* (2013.01); *G06F 17/3053* (2013.01)

(58) Field of Classification Search
CPC ..... G06F 17/3053; G06F 3/048; G06Q 30/02; G06Q 50/01
USPC ......... 707/749; 705/14.53; 715/716, 751, 853
See application file for complete search history.

(56) References Cited

U.S. PATENT DOCUMENTS

| | | | |
|---|---|---|---|
| 8,521,774 B1 * | 8/2013 | Cai et al. | 707/776 |
| 2006/0112098 A1 * | 5/2006 | Renshaw et al. | 707/7 |
| 2007/0094042 A1 | 4/2007 | Ramer et al. | |
| 2009/0281988 A1 * | 11/2009 | Yoo | 707/3 |
| 2010/0287033 A1 * | 11/2010 | Mathur | 705/10 |
| 2011/0179020 A1 * | 7/2011 | Ozzie et al. | 707/723 |
| 2011/1017906 | 7/2011 | Lee et al. | |
| 2011/0208617 A1 * | 8/2011 | Weiland | G06Q 30/0641 705/27.1 |

(Continued)

FOREIGN PATENT DOCUMENTS

| | | |
|---|---|---|
| KR | 10-2009-0072575 A | 7/2009 |
| KR | 10-2011-0000686 A | 1/2011 |

(Continued)

OTHER PUBLICATIONS

PCT International Search Report and Written Opinion, PCT Application No. PCT/US2013/036045, Jul. 22, 2013, twelve pages.

(Continued)

*Primary Examiner* — Jennifer To
*Assistant Examiner* — John Repsher, III
(74) *Attorney, Agent, or Firm* — Fenwick & West LLP

(57) ABSTRACT

Structured information about nodes may be generated and shared using sub-nodes. A node in a social networking system may be associated with sub-nodes that are definable by the node owner, such as menu items for a restaurant or songs in playlists for an artist. Users of the system may interact with the sub-nodes, and the interactions may be presented back on the page to a user, aggregated according to the user's connections in the social networking system (e.g., which songs your friends listened to the most by the artist, which menu items were consumed the most). Users may associate other sub-nodes to the node, such as identifying other menu items served by a restaurant, and the node owner may confirm these associations. Location awareness functionalities may be used to inform a user of highly recommended sub-nodes nearby as indicated by other users of the social networking system.

29 Claims, 6 Drawing Sheets

(56) References Cited

U.S. PATENT DOCUMENTS

| | | | |
|---|---|---|---|
| 2012/0005224 A1* | 1/2012 | Ahrens et al. | 707/769 |
| 2012/0084284 A1 | 4/2012 | Kang et al. | |
| 2012/0315008 A1* | 12/2012 | Dixon et al. | 386/230 |
| 2013/0086552 A1* | 4/2013 | Whitney et al. | 717/116 |
| 2013/0275506 A1* | 10/2013 | Warner | 709/204 |
| 2014/0304214 A1* | 10/2014 | Sakunkoo et al. | 706/55 |

FOREIGN PATENT DOCUMENTS

| | | |
|---|---|---|
| KR | 10-2011-0085829 A | 7/2011 |
| TW | 200951734 A1 | 12/2009 |

OTHER PUBLICATIONS

Taiwan Intellectual Property Office, Office Action, TW Patent Application No. 102113685, Mar. 17, 2015, thirty pages.

\* cited by examiner

STRUCTURED INFORMATION ABOUT NODES ON A SOCIAL NETWORKING SYSTEM

BACKGROUND

This invention relates generally to social networking, and in particular to structured information about nodes on a social networking system.

In recent years, social networking systems have made it easier for users to share their interests and preferences in real-world concepts, such as their favorite movies, musicians, celebrities, soft drinks, hobbies, sports teams, and activities. Users may use multiple social networking systems to identify their favorite restaurants, meals, and entertainment venues, for example. A user may need to navigate several different domains external to a particular social networking system to research a particular restaurant, meal, entertainment venue, movie, musician, and the like. The information available about a concept, such as a restaurant and meals served by the restaurant, may be supplied by other people unconnected to the user. Information supplied by other users connected to the user on a social networking system may not be highlighted on the various domains external to the social networking system.

Users of social networking systems have shared their interests and engaged with other users of the social networking systems by expressing their interests in these concepts on web pages on different domains external to the social networking system. The amount of information gathered from users is staggering—information describing interests in sports, music, movies, food, restaurants, and the like. Social networking systems have recorded this information to personalize the user experience, but social networking systems have lacked tools to enable users to effectively and efficiently identify shared interests in sports, music, movies, food, restaurants and the like in real-time. For example, a user of a social networking system in search of the top restaurants nearby that serve "dry-fried chicken wings" may search for those keywords on several external systems, relying on strangers' reviews, even if several friends of the user have recommended a particular restaurant. If that user finds a new restaurant that recently opened that serves amazing chicken wings, that user cannot effectively share that recommendation to other users on the social networking system.

Specifically, social networking systems have not provided tools to enable users to provide structured information about concepts and receive aggregated information about shared interests with other connected users. Enabling users to provide structured information about concepts on a social networking system provides a better understanding of the concepts on the social networking system. As more information is provided on the social networking system, users become more engaged because of the enhanced user experience. However, existing systems have not provided efficient mechanisms of receiving, aggregating, and sharing this valuable structured information.

SUMMARY

Structured information about nodes may be generated and shared using sub-nodes. A node in a social networking system, such as a page, a user, or an entity, may be associated with sub-nodes that are definable by the owner of the node, such as menu items for a restaurant or albums of songs for an artist. Users of the system may interact with the sub-nodes, and the interactions may be presented back on the page to a user, aggregated according to the user's connections in the social networking system (e.g., which songs your friends listened to the most by the artist, which menu items were consumed the most). Users may generate associations between other sub-nodes and the node, such as identifying other menu items served by a restaurant, and the owner of the node may confirm these associations. Location awareness capabilities may be used by a social networking system to inform a user of highly recommended sub-nodes nearby as indicated by other users of the social networking system. For example, a user that is currently located near a restaurant that serves highly recommended chicken wings may be informed of the restaurant through a user device connected to the social networking system.

Figure 1:
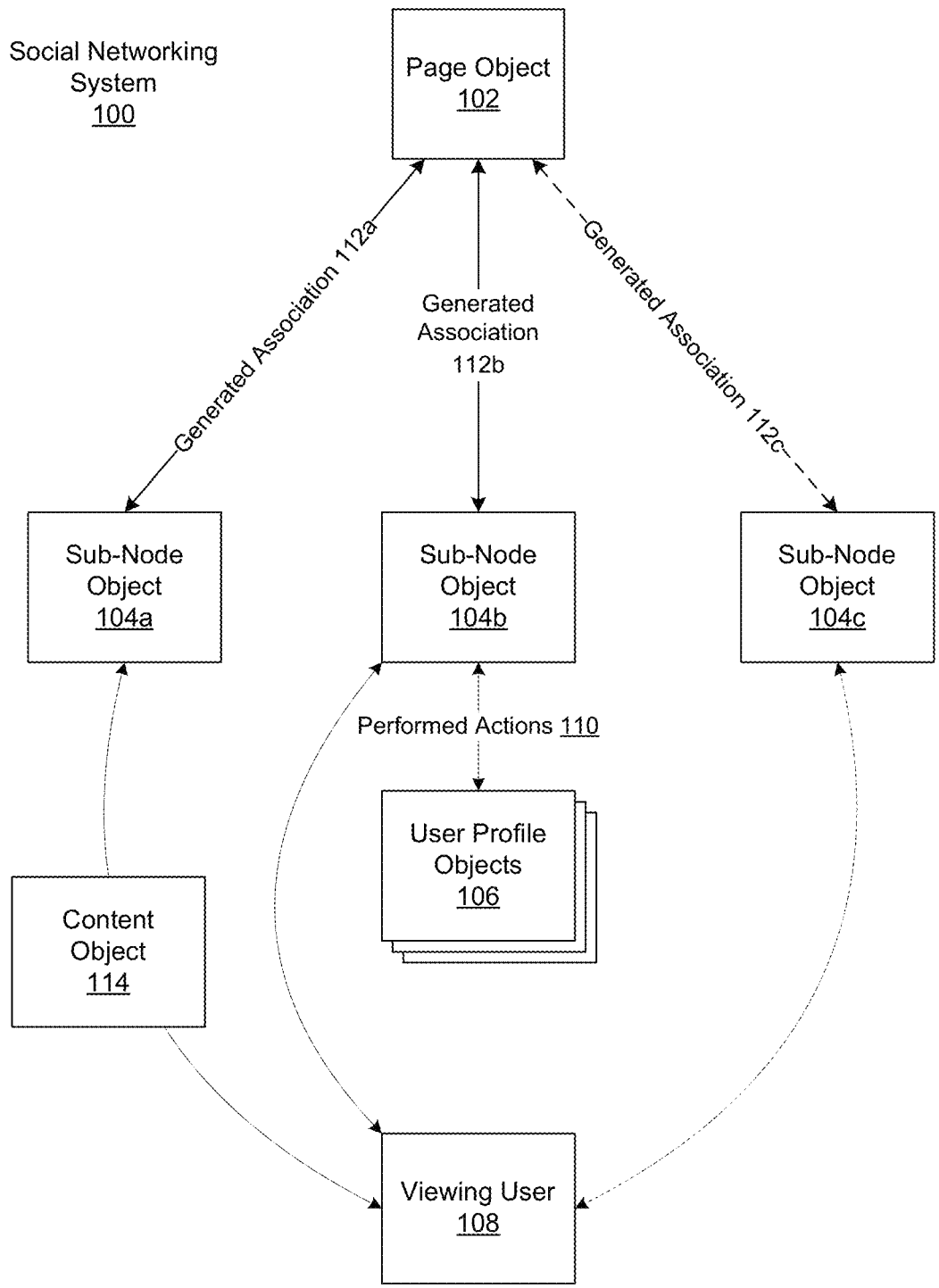
FIG. 1 is high level block diagram illustrating a process of gathering and providing structured information about a node to users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a new restaurant. The social graph may record interactions between users of the social networking system as well as interactions between users and objects of the social networking system by storing information in the nodes and edges that represent these interactions. Custom graph objects and graph actions may be defined by third-party developers as well as administrators of the social networking system to define attributes of the graph objects and graph actions. For example, a graph object for a restaurant may have several defined attributes, such as hours, location, recommendations, and various menus of food served at the restaurant. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference. Providing a social music product on a social networking system using custom graph objects and graph actions is further described in a related application, "Integrating Structured Objects and Actions Generated on External Systems into a Social Networking System," U.S. application Ser. No. 13/239,344 filed on Sep. 21, 2011, which is hereby incorporated by reference.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "San Tung Chinese Restaurant." Each of the interactions with an object may be recorded by the social networking system as an edge.

Sub-nodes may be generated for different types of nodes in a social networking system, such as pages, users, and entities. Generating sub-nodes for page objects in a social networking system may be performed through various methods. For example, a third-party external system may have listings of sub-nodes that are associated with the page object, such as menu items that a particular restaurant serves, the cast, directors, and producers of a movie, and albums and songs that have been recorded by an artist. Through an interface with the social networking system, sub-nodes may be generated for respective page objects representing the restaurant, movie, and artist to include the menu items served by the restaurant, cast, directors, and producers of the movie, and albums and songs recorded by the artist. Other third-party external systems may also have user-generated content, such as reviews of the restaurant, movie, and/or artist. The social networking system may import this user-generated content as generated sub-nodes of the respective page objects representing the particular restaurant, movie, and artist. Moreover, a sub-node for burritos, for example, may be used for all restaurants serving burritos, enabling users of a social networking system to compare user reviews of the burritos, including pictures and textual descriptions, of burritos nearby.

In one embodiment, users may generate sub-nodes for a page object by providing an indication that an unassociated sub-node should be associated with the page object. For example, a user may check-in to a restaurant using a mobile device having location awareness and be prompted with a question asking what the user ate at the restaurant. If the menu item inputted by the user is not found as a sub-node already associated with the page object for the restaurant, the sub-node may be associated with the restaurant upon approval by the page owner. This enables users of the social networking system to provide structured information about the page for the restaurant. In another embodiment, the type of node may indicate what types of sub-node objects may be associated with the page. For example, it may be assumed that a Mexican restaurant serves burritos while a Chinese restaurant serves fried rice based on template menus for each restaurant type created by administrators of the social networking system. Machine learning and heuristics analysis may also be used in generating and associating sub-node objects to page objects, as described herein.

FIG. 1 illustrates a high level block diagram of a process of gathering and providing structured information about a node to users of a social networking system, in one embodiment. The social networking system 100 generates associations 112 between a page object 102 and sub-node objects 104 after it is determined that the sub-node objects 104 should be associated with the page object 102. For example, a page owner of the page object 102 may initially determine that a sub-node object 104a should be associated with the page object 102 by providing a list of sub-node objects to the social networking system 100. Such scenarios include a page owner of a restaurant page that submits a list of menu items that correspond to the sub-node objects, a page owner of a music artist page that submits a list or database of albums and song titles recorded by the artist corresponding to sub-node objects, and a page owner of a movie page that submits a list of credits detailing the actors, writers, producers, and directors of the movie corresponding to sub-node objects. In one embodiment, the page owner may identify sub-node objects 104 through a user interface with the social networking system 100. In another embodiment, the page owner may generate new sub-node objects 104 through a user interface or through an API function call to generate new sub-node objects 104 for sub-node objects that do not match existing sub-node objects 104 in the social networking system 100. Although a page object is illustrated in FIG. 1, other types of nodes may also be associated with sub-nodes, such as custom lists of favorite sub-nodes that are associated with users of a social networking system 100, top selling sub-nodes associated with an entity, such as top selling running shoes offered on various e-commerce websites being associated with a concept for running represented by a concept page on the social networking system 100, and top consumed sub-nodes each month associated with users, such as food items.

FIG. 1 and the other figures use like reference numerals to identify like elements. A letter after a reference numeral, such as "104a," indicates that the text refers specifically to the element having that particular reference numeral. A reference numeral in the text without a following letter, such as "104," refers to any or all of the elements in the figures bearing that reference numeral (e.g. "104" in the text refers to reference numerals "104a," "104b," and/or "104c" in the figures). Only three sub-node objects 104 are shown in FIG. 1 in order to simplify and clarify the description.

User profile objects 106 that represent users of the social networking system 100 may be associated with sub-node objects 104 based on actions 110 performed on the sub-node objects 104 by the users. Each user of the social networking system 100 is associated with a specific user profile object 106. User profile objects 106 include declarative information about the user that was explicitly shared by the user and expressed in an action on objects in the social networking system 100. A viewing user 108 in the social networking system 100 may view a sub-node object 104b that is associated with user profile objects 106 based on performed actions 110 by user associated with the user profile objects 106.

Sub-node objects 104 may be associated with page objects 102 using a variety of methods, including using a third-party database or external system provides a listing of sub-nodes to the social networking system 100 to be associated with the page object 102. In one embodiment, application programming interface function calls may be provided to transfer the information about sub-nodes from the third-party database to the social networking system 100. If sub-node objects 104 are not found for the sub-nodes, based on the name of the sub-nodes, then new sub-node objects 104 may be generated. For example, a sub-node object 104a for nachos may be associated to a page object 102 for a Mexican restaurant whose page owner submitted that menu item to the social networking system 100. However, a new sub-node object 104b for flan may be generated because the sub-node object 104b for flan had not yet been created in the social networking system 100 and was not found when the page owner submitted the menu item to the social networking system 100. In another embodiment, a page owner of a page for a music artist may specify links to catalogues of music to identify links to music tracks by a music artist so that the links to the music tracks are captured as sub-node objects 104 associated with the page object 102 for the music artist. In this way, regardless of the music service used by users to listen to music by the artist, user interactions with music by the artist will be captured as interactions with the sub-node objects 104 associated with the page object 102.

Another method of generating sub-node objects 104 to be associated with a page object 102 includes identifying attributes of page objects 102 that match existing sub-node objects 104, such as actors, directors, writers, and producers for a movie represented by a page object 102. In such a case, sub-node objects 104 matching actors, directors, writers, and producers of a page object 102 are searched for in the social networking system 100 and subsequently associated with the page object 102 for the movie. If matching sub-nodes 104 are not found for actors, directors, writers, and/or producers, then new sub-node objects 104 are generated and subsequently associated with the page object 102. As another example, attributes of a particular meal served at a gourmet restaurant, such as free-range chicken, or restricted diet terms such as vegetarian, vegan, and gluten-free, may be searched as sub-objects 104 to be associated with the page object 102 for the gourmet restaurant. Inexact matching, including fuzzy matching that accounts for misspellings, and feedback from users and administrators of pages on the social networking system 100 may also be used in matching sub-node objects 104 to attributes of page objects 102.

In this way, users of a social networking system 100 may search for the best burrito in San Francisco, Calif. by searching for all restaurants that serve burritos and reading reviews of burritos eaten by the users' connections on the social networking system 100, viewing pictures of burritos, and analyzing other user generated content, such as ratings and recommendations. The social networking system 100 may aggregate this information around the sub-node object 104 for "burrito" and rank restaurants represented by page objects 102 based on consumption by users, in one embodiment. Similarly, the top song of a particular artist that has been listened to by connections of a viewing user 108 on the social networking system 100 may be aggregated by the sub-node objects 104 for the songs. As shown in FIG. 1, the viewing user 108 may be provided with a sub-node object 104b that has been identified as a top song listened to by an artist represented by the page object 102 based on custom graph listen actions, or performed actions 110, by the viewing user's connections, represented by user profile objects 106. Also, if the same song, such as "I Will Always Love You," was performed by different artists, including Whitney Houston, Dolly Parton, Jennifer Hudson, and the Glee Cast, the custom graph objects, or song objects for "I Will Always Love You" as recorded by the different artists, may be associated with a sub-node object 104 for the song and associated with the page objects 102 for the different artists. In one embodiment, the custom graph objects for the song objects for "I Will Always Love You" as recorded by the different artists may be ranked by consumption by users of the social networking system when listed on a page for the sub-node object 104 for the song.

A page object 102 may also be associated with a content object 114, such as a picture, a status update, a comment, a link, a review, a recommendation, or any other objects on the social networking system 100, based on a viewing user 108 generating the content object 114 in association with a sub-node object 104a that already has a generated association 112a with the page object 102. For example, a viewing user 108 of the social networking system 100 may be prompted to take a picture of a food item that they purchased at a restaurant. Because the restaurant is represented by a page object 102 and the food item, such as a burrito, is represented by the sub-node object 104a that has been associated with the page object 102, the picture of the burrito may be stored as a content object 114 in association with the sub-node object 104a. The page owner of the page object 102 for the restaurant may, in one embodiment, enable pictures of sub-node objects 104 that have associations 112 with the page object 102 to be displayed on the page. Thus, the content object 114 may be displayed on the page for the restaurant, along with other pictures of burritos, for example. In one embodiment, the display of content objects of a particular sub-node object 104a may be displayed in a pile format, such that multiple pictures are displayed.

In one embodiment, a sub-node object 104c may be associated with a page object 102 based on user input from a viewing user 108 in regards to the page object 102. For example, if the viewing user 108 checks-in at a restaurant represented by the page object 102, the social networking system 100 may prompt the viewing user 108 for the menu item that the user consumed at the restaurant. If the user input is not found as a sub-node object that has been previously associated with the page object 102, such as "turkey quesadilla" at a Mexican restaurant, a new sub-node object 104c named "turkey quesadilla" may be generated and associated with the page object 102 temporarily. The page owner for the page object 102 may approve the generated association 112c through a user interface for managing the page object 102 in the social networking system 100. As a result, users of the social networking system 100 may help proved structured information about nodes in the social networking system 100, such as page objects 102. This "crowd sourcing" of providing structured information for page objects 102 in a social networking system 100 by users is not limited to restaurants, but also includes songs that have been incorrectly mapped to an artist, attributing correct movie quotes to movies, and providing recommendations for products, among other use cases.

System Architecture

Figure 2:
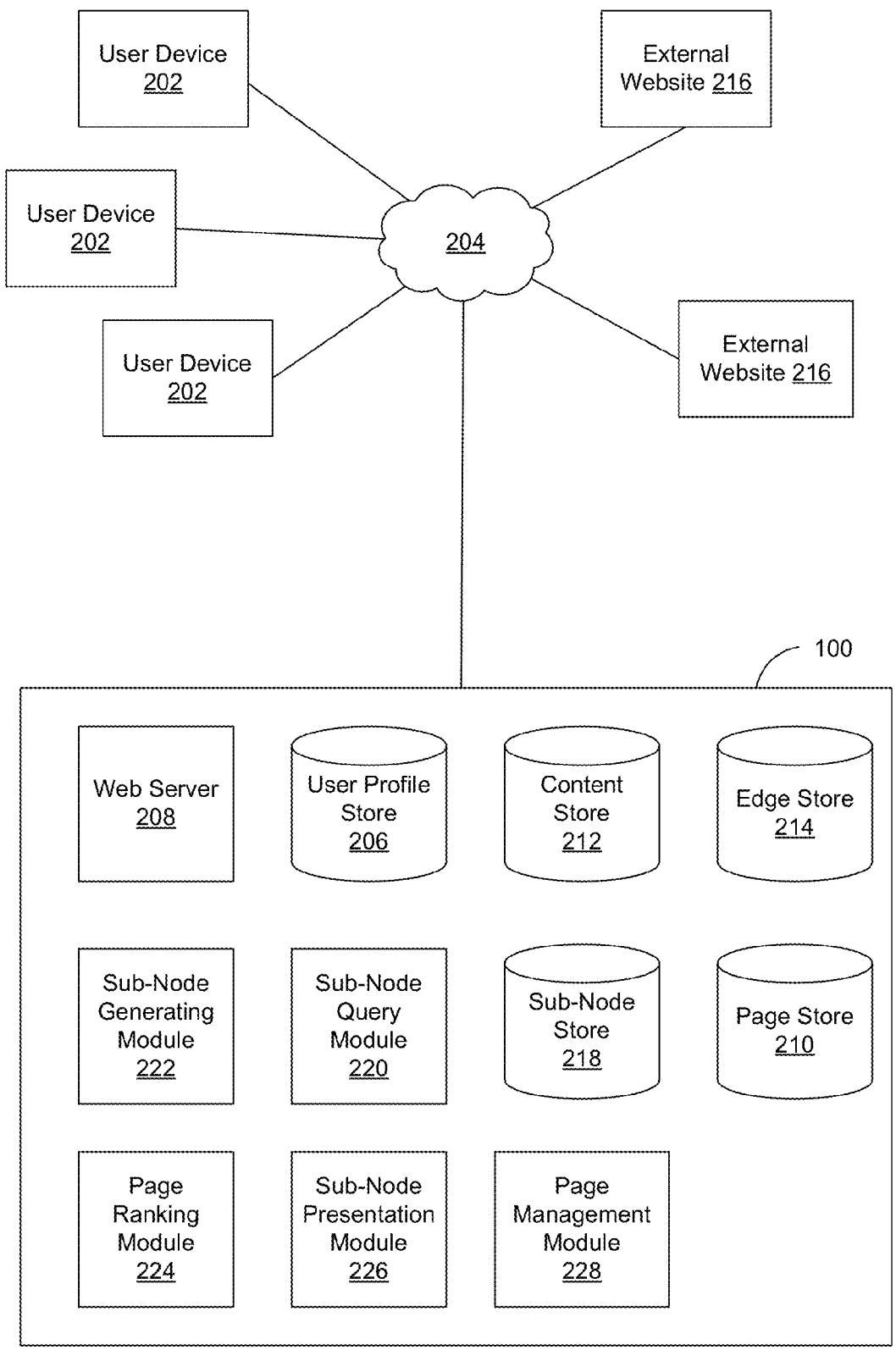
FIG. 2 is a network diagram of a system for gathering and providing structured information about a node to users of a social networking system, showing a block diagram of the social networking system, in accordance with an embodiment of the invention.

FIG. 2 is a high level block diagram illustrating a system environment suitable for gathering and providing structured information about nodes in a social networking system, in accordance with an embodiment of the invention. The system environment comprises one or more user devices 202, the social networking system 100, a network 204, and external websites 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, a page store 210, a content store 212, an edge store 214, a sub-node store 218, a sub-node query module 220, a sub-node generating module 222, a page ranking module 224, a sub-node presentation module 226, and a page management module 228. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

A page management module 228 manages structured information received for page objects 102 in a social networking system 100. For example, a page owner may submit a list of sub-node objects 104 to be associated with a page object 102 through the page management module 228. The page management module 228 may also receive user input associated with a sub-node object 104 to be associated with a page object 102. A sub-node query module 220 uses the user input to search a sub-node store 218 that includes previously generated sub-node objects 104. If a sub-node object 104 is found by the sub-node query module 220, the page management module 228 associates the resulting sub-node object 104 with the corresponding page object 102. Page objects 102 are stored in the page store 210. In one embodiment, sub-node objects 104 may be stored as content objects in the content store 212. Sub-node objects 104 may represent objects hosted on external websites 216, such as song objects, album objects, movie objects, and actor objects, as well as objects hosted on the social networking system 100, such as user profile objects of users that are part of a softball team represented by a page object 102 in the social networking system 100.

A page management module 228 may also respond to requests for generating sub-node objects 104 for page objects 102 in the social networking system 100. In one embodiment, the page management module 228 may communicate a request to generate one or more sub-node objects 104 to a sub-node generating module 222 that was received through an application programming interface (API) call. For example, a third-party developer may utilize API calls to generate sub-node objects 104 to be associated with a particular page object 102 using a listing or database of structured information, such as a discography of music performed by an artist, a menu of food items for a restaurant, and a casting credit listing of a television series. In another embodiment, the page management module 228 may communicate a request to generate one or more sub-node objects 104 to a sub-node generating module 222 that was received through a user interface on the social networking system 100 by a page owner. In a further embodiment, the social networking system 100 may receive user input from a viewing user 108 indicating that a sub-node object 104c that has not been associated with a page object 102 should be associated with the page object 102. In that case, the page management module 228 may require the page owner of the page object 102 to approve the association 112c between the sub-node object 104 and the page object 102. In yet another embodiment, the social networking system 100 may receive user input from a viewing user 108 indicating that a new sub-node object 104c should be generated and associated with a page object 102. As a result, the page management module 228 may communicate the request to generate the sub-node object 104 to the sub-node generating module 222 and generate an association 112c with the page object 102 upon approval from the page owner of the page object 102. In a further embodiment, no approval is needed to temporarily associate a sub-node to a page object. In other embodiments, based on a user's reputation score on the social networking system 100, the association may be automatically approved. Once the association is approved, the association with the sub-node is stored in the page object in the social networking system 100.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users.

A sub-node generating module 222 generates a new sub-node object upon receiving an indication that a sub-node has not been found by the sub-node query module 220. A page ranking module 224 may rank page objects 102 associated with a sub-node object 104 to determine the top pages for a particular sub-node object 104, in one embodiment. For example, Mexican restaurants represented by page objects 102 may all serve burritos and be associated with a sub-node object 104 for "burrito." Based on user interactions with the sub-node, such as users indicating through a user interface in the social networking system 100 that they consumed a burrito at a particular Mexican restaurant, photos uploaded by users depicting burritos, ratings of a burrito at each restaurant, user-generated reviews of burritos, and aggregate information about burritos consumed at Mexican restaurants in a location, page objects 102 for Mexican restaurants may be ranked by the sub-node 104 for burritos. In this way, a viewing user 108 may be provided with a page object 102 associated with the highest-ranked burritos, as ranked by the page ranking module 224. In one embodiment, the page ranking module 224 may be used to provide the best page object by sub-node filtered by a viewing user's location. In another embodiment, the page ranking module 224 may be used provide the best page object by sub-node filtered by the viewing user's connections on the social networking system 100.

A sub-node presentation module 226 may operate in conjunction with other modules of the social networking system 100 to provide users with information about sub-node objects 104 stored in the sub-node store 218. For example, a viewing user 108 may viewing a page object 102 for a Mexican restaurant called "Los Coyotes." The page object 102 may provide a complete listing of the menu items served, including burritos, quesadillas, and nachos. However, the sub-node presentation module 226 may provide a listing of the "top" menu items served by "Los Coyotes" as indicated by consumption metrics provided by the social networking system 100. For example, Los Coyotes may also serve "carne asada fries" and may be the only Mexican restaurant within 5 miles of San Francisco that serves them. As a result, many users may provide an indication to the social networking system 100 that they have consumed carne asada fries and the sub-node presentation module 226 may provide an indication that carne asada fries is a top menu item at Los Coyotes. As another example, a music artist represented by a page object 102 in the social networking system 100 may have a complete discography of tracks listed on the page in the social networking system 100. In addition, "top" songs may be provided by the sub-node presentation module 226 on the page for the music artist based on custom graph actions performed by users of the social networking system 100. For example, the song "I Wanna Go" by Britney Spears may be the most listened to song by users of the social networking system 100 that have indicated an interest in the music artist. As a result, that song, a sub-node object 104 of the page object 102 representing Britney Spears, may be listed as a "Top Song" and provided by the sub-node presentation module 226. In one embodiment, the sub-node presentation module 226 may provide the top sub-nodes filtered by a viewing user's connections, such that interactions with sub-nodes by users connected to a viewing user are the user interactions used to determine the top sub-nodes associated with a page object 102. Thus, the viewing user is provided with the top sub-nodes interacted with by other users of the social networking system 100 connected to the viewing user. Similarly, other filters may be used by the sub-node presentation module 226 to provide top sub-nodes filtered by location, affinity for other objects in the social networking system 100, and most recent user interactions in other embodiments.

Generating Sub-Nodes on a Social Networking System

Figure 3:
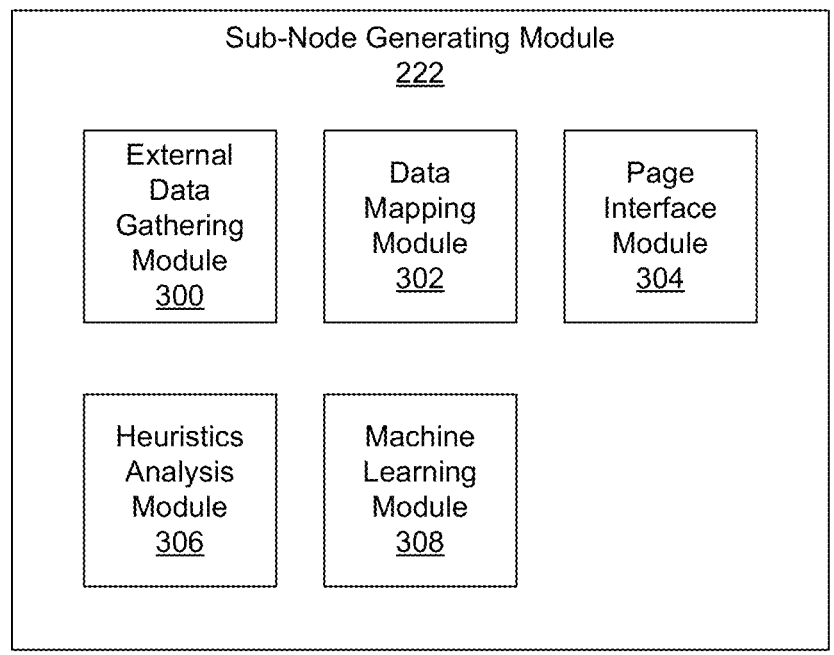
FIG. 3 is high level block diagram illustrating a sub-node generating module that includes various modules for providing structured information about nodes in a social networking system, in accordance with an embodiment of the invention.

FIG. 3 illustrates a high level block diagram of the sub-node generating module 222 in further detail, in one embodiment. The sub-node generating module 222 includes an external data gathering module 300, a data mapping module 302, a page interface module 304, a heuristics analysis module 306, and a machine learning module 308. These modules may perform in conjunction with each other or independently to provide structured information about nodes in a social networking system 100.

An external data gathering module 300 interfaces with external websites 216 to process information about sub-node objects 104 of the social networking system 100. This information may include content on a third-party website and other data licensed from third-party providers. For example, a page owner of a page object 102 for a restaurant may already have menu items listed on an external website 216. The external data gathering module 300 may be used to gather such menu information for the page object 102 to generate sub-nodes. In addition, third-party external systems, such as restaurant review websites, may license information about restaurants to the social networking system 100 to provide user-generated content to the social networking system 100 about the restaurant through the external data gathering module 300. As another example, music streaming websites may enable a page owner of a page object 102 representing a music artist on the social networking system 100 to provide a link to a music catalogue of the artist's tracks on the music streaming websites. The external data gathering module 300 may import the music catalogue of the artist's tracks to generate a sub-node object 104 for each of the tracks and associate the generated sub-node objects 104 to the page object 102 for the artist. In one embodiment, the external data gathering module 300 may process the information retrieved from external websites 216 in a batch process asynchronously from the sub-node generating module 222. Multiple music catalogues for an artist's tracks may be gathered by the external data gathering module 300 and de-duplicated based on the same song objects having the same attributes.

A data mapping module 302 ensures that data gathered from external systems have been mapped to the correct page object in the social networking system. For example, a page object 102 may exist for a dog named "Biggie Smalls," a name that also refers to a rapper. The social networking system 100 may use the data mapping module 302 to ensure that songs by the rap artist "Biggie Smalls" is not mapped to a page object 102 for the dog with the same name. In one embodiment, the data mapping module 302 uses node types of the page objects to determine whether the external data should be mapped to the page. For example, a page object in the social networking system may have a node type of "musician/band," as opposed to "entertainer."

The data mapping module 302 may map external data based on analyzing attributes of the page objects to identify matching external data. Page objects may be associated with a graph object type that has been defined to have multiple attributes, or object properties. For example, a movie object type may be defined to have properties such as a director object type, a producer object type, a lead actor type, and the like. Matching external data to objects in a social networking system is further discussed in a related application, "Enabling Preference Portability for Users of a Social Networking System," U.S. patent application Ser. No. 13/294,998 filed on Nov. 11, 2011, hereby incorporated by reference. In this way, multiple streaming music services may be linked to the same sub-node object 104 for a song that is listed on the artist's page on the social networking system 100. In one embodiment, a viewing user may select a particular streaming music service when multiple streaming music services are associated with the same sub-node object 104.

The page interface module 304 may be used by page owners of page objects to generate sub-node objects and associate them to page objects. In one embodiment, a page owner may use a user interface with the social networking system 100 to manually input information about sub-nodes related to a page object, such as menu items for a restaurant, songs played by an artist, and movies directed by a director. The page interface module 304 gathers the user input by the page owner to generate sub-nodes in the social networking system 100. In another embodiment, the page owner may use application programming interface (API) calls to communicate information about sub-nodes. The page interface module 304 gathers the information about sub-nodes for generating sub-nodes in the social networking system 100. In another embodiment, a page owner may use the user interface provided by the page interface module 304 to upload an electronic file listing sub-nodes to be associated with the page, such as menu items for a restaurant stored in an Excel spreadsheet or comma separated value file.

A heuristics analysis module 306 operates independently and asynchronously from the other modules in the sub-node generating module 222. The heuristics analysis module 306 performs various steps to gather information from the social networking system 100. For example, an action log includes actions that users perform on the social networking system. The heuristics analysis module 306 may be used to analyze the level of communications activity for pages on the social networking system to determine whether those communications included certain keywords, such as "burrito," that may indicate which types of restaurants serve that item. This may help to suggest new sub-nodes to other page objects that represent Mexican restaurants that may serve the menu item but had not yet associated the menu item with the restaurant's page object.

Another use of the heuristics analysis module 306 includes gathering and analyzing different types of information about sub-node objects that have been generated. For example, users of a social networking system 100 may upload pictures of food items that they are especially excited about eating, such as a pasta dish from a gourmet Italian restaurant. The heuristics analysis module 306 may identify sub-node objects that are associated with the most pictures uploaded by the social networking system 100 to identify the top food items to eat in a certain location. This information may be used by other modules in the social networking system 100 to enhance the user experience, such as providing a notification to a viewing user of the social networking system 100 that a nearby restaurant, based on the viewing user's geographic location as indicated by location awareness technology embedded in the viewing user's user device, such as Global Positioning Systems (GPS), serves a highly ranked pasta dish, based on the number of pictures uploaded by users, restaurant reviews retrieved from external systems, and consumption data by users that are connected to the viewing user.

A machine learning module 308 may be used in the sub-node generating module 222 to refine data mapping of external data and other information gathered about sub-node and page objects in the social networking system 100. In one embodiment, a social networking system 100 uses a machine learning algorithm to analyze user feedback received from the user feedback module to train the data mapping model for mapping sub-node objects to page objects based on external data. For example, a user of the social networking system 100 may identify that a song by the rapper Biggie Smalls was incorrectly mapped to a page object for a page for the entertainer "Biggie Smalls," a pet dog with the same name. This user feedback may be used by the machine learning module 308 to retrain the data mapping model. Another use of the machine learning module 308 may include recognizing patterns in consumption data of sub-node objects in the social networking system 100, such as certain dishes and meals consumed more than others by demographics, including age, race, gender, location, education, work experience, interests, and so on.

Figure 4:
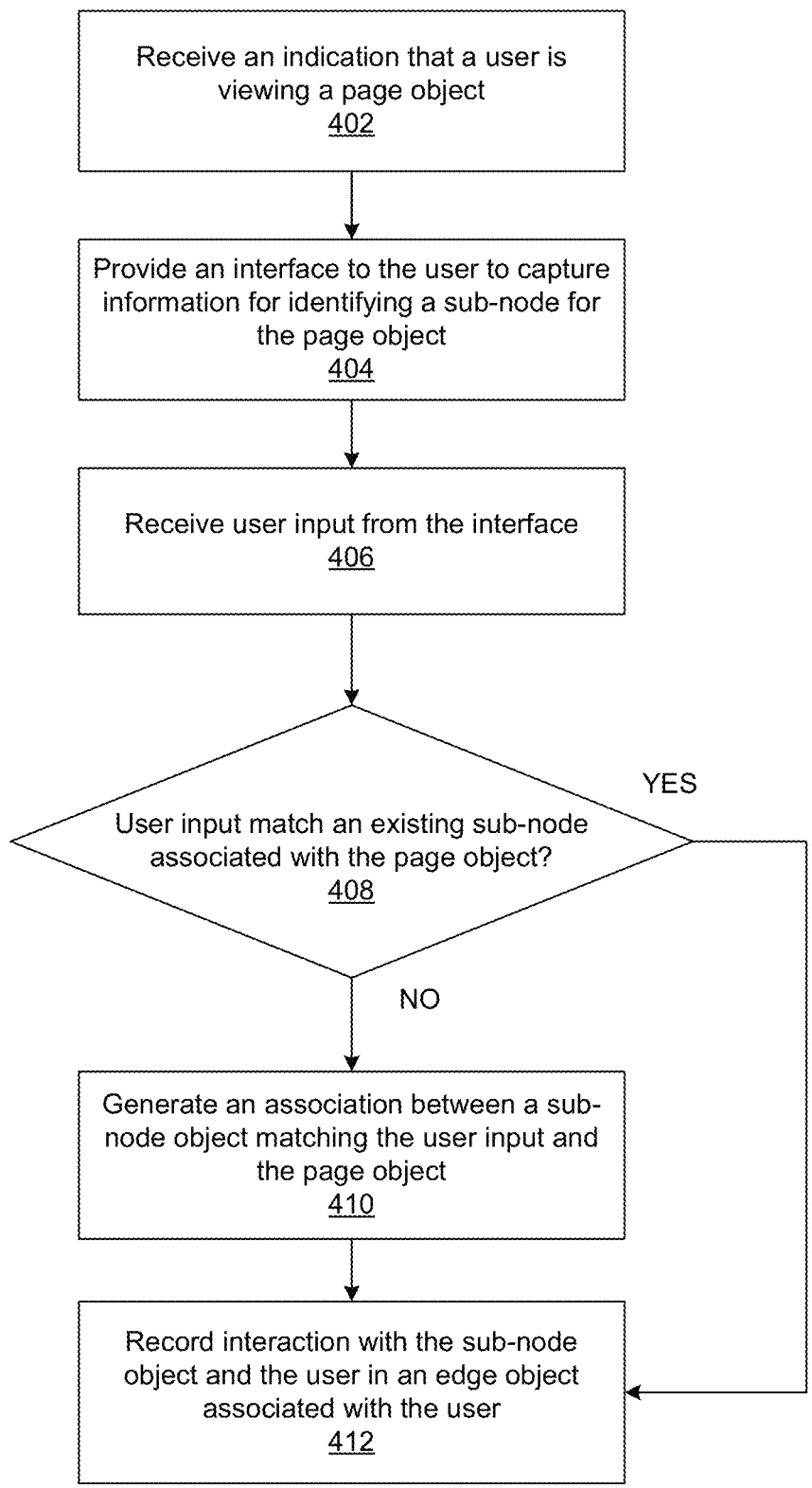
FIG. 4 is a flowchart of a process of gathering structured information about nodes in a social networking system, in accordance with an embodiment of the invention.

FIG. 4 illustrates a flow chart diagram depicting a process of gathering structured information about nodes in a social networking system, in accordance with an embodiment of the invention. An indication that a user is viewing a page object is received 402 by the social networking system 100. This indication may be received 402 based on the user viewing the page on the social networking system 100 associated with the page object, checking into a place associated with the page object through a mobile device, checking into an event associated with the page object, and tagging a content item to be associated with the page object, for example.

After the indication that the user is viewing the page object is received 402, the user is provided 404 an interface to capture information for identifying a sub-node for the page object. The interface may include prompts for asking what the user consumed while viewing the page object, such as consuming a food item at a restaurant, watching a video clip of a television show, listening to a song at a music concert, and rooting for particular player on a sports team. In each of these examples, the item being consumed corresponds to information for identifying a sub-node for the page object. In one embodiment, the interface provided 404 to the user includes a text input dialog box. In another embodiment, the interface provided 404 to the user includes a graphical user interface that includes selectable thumbnail pictures of sub-node objects already associated with the page object.

In a further embodiment, the interface provided 404 to the user comprises an application programming interface (API) that enables a page owner, such as a restaurant owner, music artist, or sports team manager, to upload a listing of sub-node objects received through an external system, such as a food ordering system, a music library database, or a sports team management system. In yet another embodiment, the interface provided 404 to the user comprises a user interface that enables a page owner to upload a file, such as an Excel spreadsheet, a database file, or a comma separated value file, to the social networking system 100 that provides a listing of sub-nodes to be associated with the page. For example, a page owner of a restaurant page may upload a file that includes the menu being served at the restaurant. Each of the menu items in the file may be searched for in the social networking system based on keywords in the listing to identify a sub-node matching the menu item.

After the interface is provided 404 to the user to capture information for identifying a sub-node for the page object, user input is received 406 from the interface. As mentioned above, user input such as a selection of a link for a sub-node may be received 406 from the interface, text input matching the name of a sub-node may be received 406 from the interface, as well as a selection of a thumbnail picture of a sub-node may be received 406 from the interface, in various embodiments. In another embodiment in which the interface comprises an API, the user input may include an API call that is received 406 by the interface. The API call may include identifying information of a sub-node object, such as a sub-node object identifier or the name of the sub-node. In yet another embodiment, the user input that is received 406 may include a file that is uploaded by the user, such as an Excel spreadsheet or comma separated value file.

Once the user input is received 406 from the interface, the social networking system determines 408 if the user input matches an existing sub-node associated with the page object. For example, text input received 406 from the interface is searched in the sub-node store for sub-nodes that match the text input. If a matching sub-node object is found, the social networking system 100 may determine if that sub-node object has already been associated with the page object. As another example, a selected link received 406 as user input from the interface may be associated with a sub-node object that may or may not be associated with the page object. In a further embodiment in which a listing of sub-nodes is received 406 as user input, through an uploaded file or in an API call, the matching step 408 repeats with each user inputted item in the listing to determine if a matching sub-node object is found. If the user input matches an existing sub-node that has already been associated with the page object, then the interaction with the sub-node object and the user is recorded 412 in an edge object associated with the user.

If the user input does not match an existing sub-node associated with the page object, then an association is generated 410 between a sub-node object matching the user input in association and the page object. In one embodiment, if a sub-node object matching the user input was not found in the social networking system 100, such as a "tofu taco" food item at a Mexican restaurant, a new sub-node object would be generated for the received user input and an association with the sub-node object for the "tofu taco" would be generated 410 with the page object for the Mexican restaurant. In another embodiment, the association generated 410 between a newly created sub-node object and the page object may be subject to review and approval by a page owner of the page object. In this way, fraudulent sub-nodes may not be generated and/or associated with a page object without the permission of the page owner. After the new association between the page object and the sub-node object matching the user input is generated 410, then the interaction with the sub-node and the user is recorded 412 in an edge object associated with the user.

Providing Sub-Nodes to Users of a Social Networking System

Figure 5:
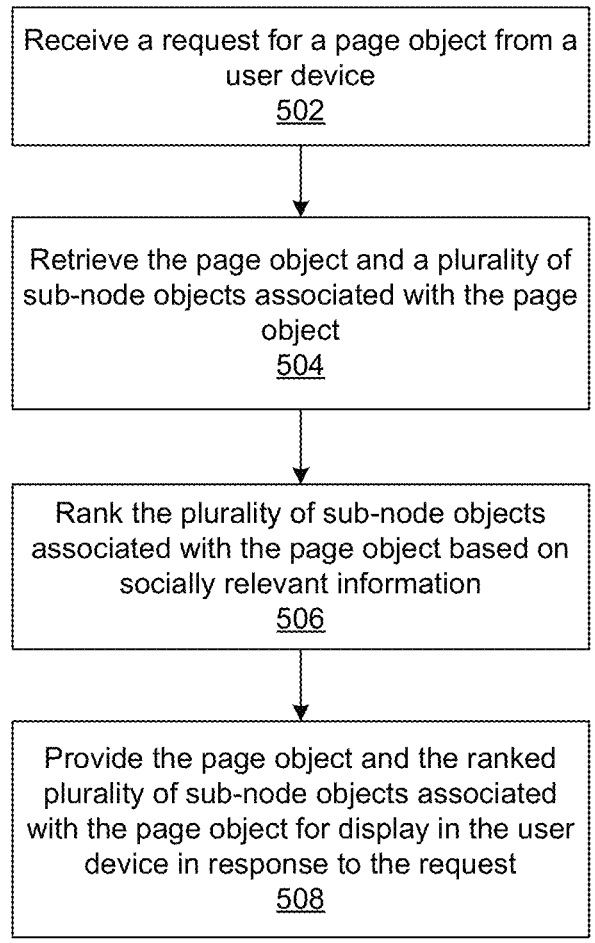
FIG. 5 is a flowchart of a process of providing structured information about nodes in a social networking system, in accordance with an embodiment of the invention.

FIG. 5 is a flowchart diagram depicting a process of providing structured information about nodes in a social networking system, in accordance with an embodiment of the invention. A request for a page object is received 502 from a user device. For example, a web browser on a user's personal computer may be loading a web page hosted on an external website 216 outside the social networking system 100. The web page may include an embedded code snippet, widget, or social plug-in that requests the page object for a music artist, such as Britney Spears, from the social networking system 100. The web page being loaded, such as a fan web site about Britney Spears, may use the social plug-in to retrieve information from the page object on the social networking system about the music artist, such as sub-node objects associated with the page object. For example, links to music streaming services may be stored as song objects that are associated with sub-node objects. As a result, users of the external fan website may execute a custom graph action of "playing" song objects listed on the artist page for Britney Spears through the social plug-in embedded on the external fan website. In another embodiment, a viewing user of the social networking system 100 may wish to browse the artist page for Britney Spears on the social networking system 100. As a result, the social networking system 100 may receive 502 the request for a page object from a user device associated with the viewing user.

Responsive the request received 502 by the social networking system 100, a page object associated with the page object in the request and a plurality of sub-node objects associated with the page object is retrieved 504. Continuing the example above, the page object associated with the artist, Britney Spears, is retrieved along with sub-node objects associated with the artist page. Such sub-node objects may include albums each having multiple tracks, or songs by the artist, Britney Spears. In this way, the external fan website may enable users to play music by Britney Spears using the social plug-in. In another embodiment in which a request for the page object for the page for Britney Spears is received 502 from a social plug-in, the page object and associated plurality of sub-node objects would be retrieved 504 responsive to the request.

After the page object and associated sub-node objects are retrieved 504, the plurality of sub-node objects associated with the page object are ranked 506 based on socially relevant information. A ranking model may be used to rank 506 the sub-nodes associated with the page object based on socially relevant information. Socially relevant information may include affinity scores for interests, objects, and other users. The ranking model may incorporate socially relevant information as weighted factors in the ranking model. In one embodiment, a ranking model may be defined by administrators of the social networking system 100 with predetermined weights. Machine learning and heuristics analysis may be used to refine the weights over time, training on user feedback and measuring engagement with page objects and sub-node objects.

Continuing the previous example, a viewing user associated with the user device that sent the request for the page object about Britney Spears may have expressed an interest in Britney Spears as well as certain songs by Britney Spears, such as "Baby One More Time" and "Womanizer" As a result, these songs, represented by sub-node objects, may be ranked higher than other songs. In another embodiment, the viewing user may not have expressed an interest in Britney Spears, but other users of the social networking system 100 connected to the viewing user may have expressed an interest in Britney Spears as well as her other songs, such as "Oops, I Did it Again" and "Crazy." As a result, those songs may be ranked higher than the other songs by Britney Spears due to the interests expressed by other users connected to the viewing user. The page object and the ranked plurality of sub-node objects associated with the page object may then be provided 508 to the user device, in one embodiment.

In a further embodiment, actions performed by the viewing user and other users connected to the viewing user on the social networking system may be related to sub-node objects, such as songs and albums, associated with the page object for Britney Spears. Custom graph actions such as "purchase," "listen," and "share" may be performed on sub-node objects for songs and/or albums. For example, a viewing user may operate a third party external application that plays streaming music onto the viewing user's desktop computer. Using this external application, the viewing user may listen to various songs by Britney Spears, and this user activity may be communicated to the social networking system as multiple custom graph actions of "listening" performed on custom graph objects for the songs being streamed on the external application. In another embodiment, the viewing user may purchase various songs by Britney Spears through a music store hosted on an external website, such as Amazon.com, or through an external application, such as iTunes, and this user activity may be communicated to the social networking system as multiple custom graph actions of "purchasing" performed on custom graph objects for the songs. In a further embodiment, the viewing user may share various songs by Britney Spears through an external application for sharing music, such as Spotify, through an external website for sharing music, such as Turntable.fm, or through the social networking system, and this user activity may be communicated to the social networking system as multiple custom graph actions of "sharing" performed on custom graph objects for the songs.

In one embodiment, the custom graph objects may be associated with sub-node objects. In another embodiment, sub-node objects may comprise the custom graph objects. As a result, the social networking system 100 may use the user activity information about custom graph actions performed on custom graph objects to rank 506 sub-nodes associated with a page object. This enables the social networking system 100 to provide the songs most listened to by the viewing user, songs most listened to by other users connected to the viewing user, top songs listened to by user demographics, location, genre, and any combination of user attributes as well as sub-node attributes. In this way, socially relevant information may include custom graph actions performed on custom graph objects that are associated with the sub-node objects and/or the page object.

In another embodiment in which a widget, or social plug-in, requested the page object and associated plurality of sub-node objects, the viewing user's preferences and actions in the social networking system, along with the preferences and actions of other users connected to the viewing user, may be used in ranking 506 the plurality of sub-node objects associated with the page object for display within the widget or social plug-in. Thus, if the viewing user had previously listened to a song by Britney Spears on the social networking system 100 that is represented by a sub-node object associated with the page object, then the viewing user, upon opening the fan page for Britney Spears on the external website 216 that has embedded the widget, or social plug-in, may be presented with the song she previously listened to first because that song had been ranked 506 higher than other songs by Britney Spears. The fan website for Britney Spears that has embedded the widget may provide 508 the page object and the ranked plurality of sub-node objects associated with the page object within the widget for display to the user device responsive to the request. Similarly, the widget may, in another embodiment, request socially relevant information about users connected to the viewing user interacting with sub-node objects associated with the page object for Britney Spears. This information may be used in ranking the sub-node objects interacted with by the other users (e.g., songs by Britney Spears listened to frequently by other users for which the viewing user has a high affinity) associated with the page object for Britney Spears for display to the viewing user.

In a further embodiment, the page object and the ranked plurality of sub-node objects associated with the page object may be provided 508 in response to the request to the user device. The ranked plurality of sub-node objects may be provided within a page on the social networking system 100 associated with the page object, in one embodiment. The ranked plurality of sub-node objects may also be provided in a separate interface associated with the page object, in another embodiment. In yet another embodiment, a listing of sub-node objects associated with the page object may be provided in conjunction with the ranked sub-node objects provided 508 within the page on the social networking system for the page object.

In other embodiments, sub-node objects may be viewed individually or in groups by a viewing user of the social networking system 100. The social networking system 100 may provide an interface for users to view individual sub-nodes, such as food items, songs, albums, sporting games, and the like. For example, a viewing user may view typical Mexican food items, such as tacos, burritos, and quesadillas, as well as restaurants represented by pages that serve these items. Highly ranked pages associated with the sub-nodes may be provided in the interface. In yet another embodiment, a location aware mobile application of the social networking system 100 may suggest highly ranked food items within walking distance of the mobile user device based on actions performed by users of the social networking system 100 as well as the proximity of the mobile user device to the restaurants having the highly ranked food items.

Figure 6:
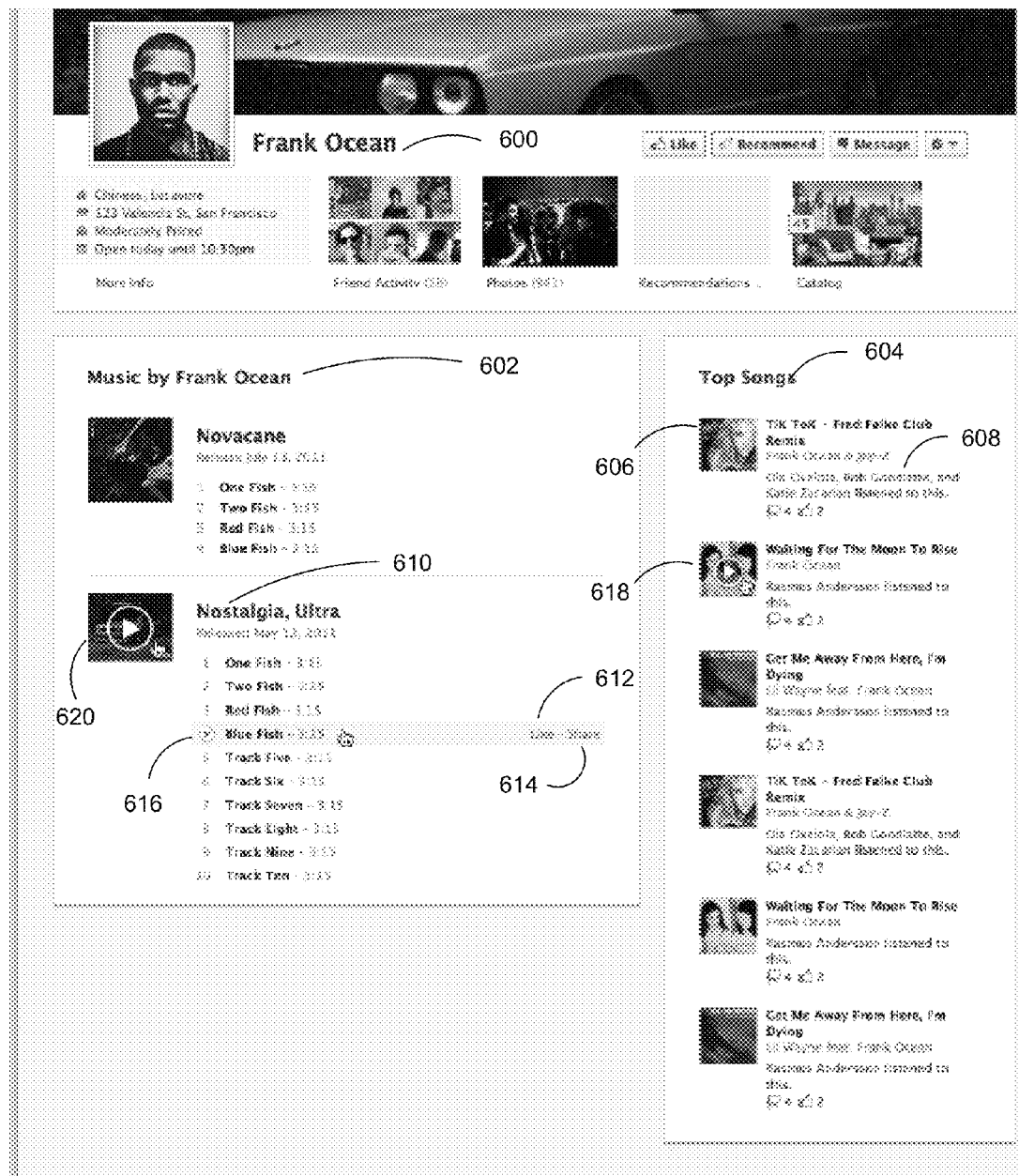
FIG. 6 is an example user interface for providing structured information about nodes in a social networking system, in accordance with an embodiment of the invention.

FIG. 6 illustrates an example user interface for providing structured information about nodes in a social networking system, in accordance with an embodiment of the invention. The social networking system 100 may provide an artist page 600 on the social networking system 100 that includes a discography module 602 that includes all albums and tracks associated with the albums recorded by the artist. Here, the artist page 600 is for Frank Ocean, and the discography module 602 includes two albums released by Frank Ocean, Novacane and Nostalgia, Ultra.

The artist page 600 also includes a separate top songs module 604 that provides the viewing user with a number of top songs that include the artist, Frank Ocean, based on a ranking model that incorporates socially relevant information, as mentioned above. The first track 606 listed in the top songs module 604 is "Tik Tok—Fred Falke Club Remix" by Frank Ocean & Jay-Z. User interaction activity 608 for the first track 606 indicate that several users have "listened to this," indicating that other users, connected to the viewing user, have listened to the first track 606 either through the social networking system 100 or through an external music service or system. The user interaction activity 608 for the first track 606 also indicates four comments and two expressions of interest in the first track 606. In another embodiment, the top songs module 604 may include the top songs across the social networking system 100. In yet another embodiment, the top songs module 604 may rank songs listened to by other users connected to the viewing user in the social networking system 100. In a further embodiment, a filter selection user interface may be provided by the top songs module 604 to select various filters to use in ranking the top songs, such as top songs among close friends, among all users, by location, by network, by group, by age, gender, interest, mutual interest in an artist, and so on.

The artist page 600 may enable a viewing user of the social networking system 100 to view tracks by album recorded by the artist and listen to the tracks through the social networking system 100. For example, the second album 610 listed in the discography module 602 includes several tracks recorded by Frank Ocean, such as a track 612 named "Blue Fish." The viewing user may perform social interactions 614 with the track 612 by expressing interest in the track 612 by "liking" the track and sharing the track. The viewing user may also listen to the track 612 by selecting a linked button 616 to start playing the track. In one embodiment, the track 612 may start playing through the social networking system 100. A music service may automatically stream the track 612 through the social networking system 100 after the viewing user clicks on the linked button 616. In another embodiment, where multiple music services and/or music catalogues have been linked to the artist page 600, the social networking system 100 may select the best music service for the viewing user based on the viewing user's preferences.

In another embodiment, an external music service, such as Spotify, Rdio, and Earbits, may be launched after a viewing user clicks on the linked button 616 for the track 612, such that the track 612 begins playing in the external music service. As the track 612 is streaming through the social networking system 100, an indication 620 may appear on the discography module 602 that the album is currently being listened to by the viewing user. Clicking on album icons, such as an icon 618 for another song title "Waiting For The Moon To Rise" by Frank Ocean, may similarly start the playing of the track through the social networking system 100 or through an external music service.

In other embodiments, the social networking system 100 may partner with external websites, such as Yelp.com, to exchange information about what a user may have consumed while at a restaurant, for example. The external website may be connected with the social networking system 100 so that reviewers on the external website may view photos uploaded by users of the social networking system 100 of the food items they consumed at the restaurant. As another example, an external website representing a concert ticket seller for multiple artists may partner with the social networking system 100 to share information that users have agreed to share, such as photos and videos of past concerts by artists. In yet another example, an external website selling consumer products, such as shoes, phones, and cameras, may partner with the social networking system 100 to include photos of users wearing shoes, using the phones, or photos taken by the cameras that were purchased. Based on the structured information provided by sub-nodes, external websites may have access to user-generated content that was previously not accessible. Through the collection of structured data, the social networking system 100 may enable users to provide the structured data in the form of sub-nodes to be associated with page objects as well as social information, such as going out to dinner at a Chinese restaurant and splitting dry-fried chicken wings with two of your friends. A page for the Chinese restaurant may, over time, know that you and your friends enjoy dry-fried chicken wings based on the aggregated sub-node interactions. Pictures of the dry-fried chicken wings may be shared, based on the user's privacy settings, with external websites so that users of the external websites may know where to get the best dry-fried chicken wings. This information about the user and his friends' love of dry-fried chicken wings, represented as a sub-node, may be sold by the Chinese restaurant to advertisers through the social networking system 100, in one embodiment. In another embodiment, the social networking system 100 may aggregate this information around the sub-node for the chicken wings and provide advertisers an option of targeting to the user and his friends based on the aggregated information around the sub-node.

In one embodiment, the social networking system 100 may provide a suggestion of a sub-node to a viewing user, based on the location of the sub-node in relation to the viewing user, such as an upcoming concert, a new menu item being served at a favorite restaurant, a drink special at a bar or club frequently visited by the viewing user, a highly recommended dish by other users connected to the viewing user at a nearby restaurant, and so on. Other recommendations may also be provided, such as top songs listened to by other users of the social networking system connected to the viewing user, top videos watched, top games played, and top applications used in the past week, for example. In another embodiment, users of the social networking system 100 may generate custom lists of sub-nodes in the social networking system 100. For example, a user may generate a playlist of favorite songs by various artists that may be played on one or more music streaming services through the social networking system 100. The generated playlist may be stored as a content object in the social networking system 100 and may be commented on, "liked," and/or shared by other users of the social networking system 100. As another example, a user may generate a list of favorite foods from particular restaurants, such as chicken wings from a particular Chinese restaurant, a California burrito served at a Mexican restaurant, and Szechuan chicken found at a grocery store in Palo Alto, Calif. These user-generated lists may be stored as sub-node objects to be associated with the user of the social networking system 100, in one embodiment. In this way, structured information, in the form of sub-nodes about nodes, such as pages, users, and entities, may be received, gathered, and shared in the social networking system 100.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining a plurality of nodes in a social networking system, where the plurality of nodes represent a plurality of entities and concepts in the social networking system;
   maintaining, in the social networking system, a plurality of sub-nodes of the plurality of nodes;
   generating a plurality of associations between the plurality of sub-nodes and the plurality of nodes, comprising:
      retrieving a plurality of attributes about a specified node of the plurality of nodes;
      determining a subset of the plurality of sub-nodes matching the plurality of attributes about the specified node; and
      for each sub-node of the determined subset, storing an association between the sub-nodes and the specified node in the social networking system;
   receiving, from a user device associated with a viewing user of the social networking system, information identifying a particular sub-node of the plurality of sub-nodes;
   retrieving one or more particular nodes of the plurality of nodes associated with the particular sub-node related to the received information identifying the particular sub-node;
   determining, based on the plurality of associations, which of a plurality of users is connected to the viewing user in the social networking system;
   determining a number of interactions between the users connected to the viewing user and the particular sub-node;
   providing a suggestion for display on the user device to the viewing user, the suggestion including the one or more particular nodes associated with the particular sub-node with the highest determined number of interactions between the users connected to the viewing user and the associated particular sub-node.

2. The method of claim 1, wherein receiving, from a user device associated with a viewing user of the social networking system, information identifying a particular sub-node of the plurality of sub-nodes further comprises:
   receiving a search query for the particular sub-node of the plurality of sub-nodes in the social networking system from the viewing user.

3. The method of claim 2, wherein providing a suggestion for display on the user device to the viewing user further comprises:
   ranking a plurality of search results responsive to the received search query for the particular sub-node of the plurality of sub-nodes in the social networking system, where the ranking accounts for a plurality of preferences of the viewing user retrieved from the social networking system; and
   providing the suggestion based on the ranking of the plurality of search results.

4. The method of claim 1, wherein providing a suggestion for display on the user device to the viewing user, the suggestion including the one or more particular nodes and the associated particular sub-node further comprises:
   retrieving a plurality of content items associated with the particular sub-node; and
   providing the retrieved plurality of content items associated with the particular sub-node for display in association with the suggestion.

5. The method of claim 4, wherein the plurality of content items further comprises a plurality of photos uploaded to the social networking system by a plurality of users of the social networking system interacting with the particular sub-node.

6. The method of claim 4, wherein the plurality of content items further comprises a plurality of reviews uploaded to the social networking system by a plurality of users of the social networking system interacting with the particular sub-node.

7. The method of claim 4, wherein the plurality of content items further comprises a plurality of reviews retrieved from an external system outside the social networking system, where the plurality of reviews relate to the particular sub-node.

8. The method of claim 1, wherein the plurality of sub-nodes further comprises a plurality of custom graph objects comprising a plurality of song objects playable through the social networking system using one or more external music streaming services connected to the social networking system, further comprising:
   receiving a selection of the particular sub-node for playing a song object associated with the particular sub-node; and
   responsive to the received selection, sending a request to the one or more external music streaming services connected to the social networking system to play a song corresponding to the selected song object associated with the particular sub-node.

9. The method of claim 8, wherein the plurality of nodes further comprises a plurality of album objects associated with the plurality of song objects, further comprising;
receiving a selection of a selected node of the one or more particular nodes for playing an album object associated with the selected node; and
responsive to the received selection, sending a request to the one or more external music streaming services connected to the social networking system to play an album corresponding to the selected album object associated with the selected node.

10. The method of claim 1, wherein generating a plurality of associations between the plurality of sub-nodes and the plurality of nodes further comprises:
providing a user interface for generating the plurality of associations between the plurality of sub-nodes and the plurality of nodes;
receiving user input within the user interface, where the user input identifies an association between one or more particular sub-nodes of the plurality of sub-nodes and a particular node of the plurality of nodes; and
storing the association between the one or more particular sub-nodes and the particular node in the social networking system.

11. The method of claim 10, wherein the user input further comprises an electronic file listing the one or more particular sub-nodes to be associated with the particular node.

12. The method of claim 10, wherein the user input further comprises textual user input identifying one or more particular sub-nodes to be associated with the particular node.

13. The method of claim 10, wherein the user input further comprises an application programming interface call identifying the one or more particular sub-nodes to be associated with the particular node.

14. The method of claim 1, further comprising:
receiving a request for a targeting cluster from an advertiser, where the targeting cluster includes the particular sub-node as targeting criteria;
retrieving a plurality of past user interactions with the particular sub-node performed by a plurality of users of the social networking system; and
providing the plurality of users that performed the plurality of past user interactions with the particular sub-node as the targeting cluster responsive to the request from the advertiser.

15. A non-transitory computer readable storage medium storing one or more programs configured to be executed by a server system, the one or more programs comprising instructions for:
maintaining a plurality of nodes in a social networking system, where the plurality of nodes represent a plurality of entities and concepts in the social networking system;
maintaining, in the social networking system, a plurality of sub-nodes of the plurality of nodes;
generating a plurality of associations between the plurality of sub-nodes and the plurality of nodes, comprising:
retrieving a plurality of attributes about a specified node of the plurality of nodes;
determining a subset of the plurality of sub-nodes matching the plurality of attributes about the specified node; and
for each sub-node of the determined subset, storing an association between the sub-nodes and the specified node in the social networking system;
receiving, from a user device associated with a viewing user of the social networking system, information identifying a particular sub-node of the plurality of sub-nodes;
retrieving one or more particular nodes of the plurality of nodes associated with the particular sub-node related to the received information identifying the particular sub-node;
determining, based on the plurality of associations, which of a plurality of users is connected to the viewing user in the social networking system;
determining a number of interactions between the users connected to the viewing user and the particular sub-node;
providing a suggestion for display on the user device to the viewing user, the suggestion including the one or more particular nodes associated with the particular sub-node with the highest determined number of interactions between the users connected to the viewing user and the particular sub-node.

16. The non-transitory computer readable storage medium of claim 15, wherein receiving, from a user device associated with a viewing user of the social networking system, information identifying a particular sub-node of the plurality of sub-nodes further comprises:
receiving a search query for the particular sub-node of the plurality of sub-nodes in the social networking system from the viewing user.

17. The non-transitory computer readable storage medium of claim 16, wherein providing a suggestion for display on the user device to the viewing user further comprises:
ranking a plurality of search results responsive to the received search query for the particular sub-node of the plurality of sub-nodes in the social networking system, where the ranking accounts for a plurality of preferences of the viewing user retrieved from the social networking system; and
providing the suggestion based on the ranking of the plurality of search results.

18. The non-transitory computer readable storage medium of claim 15, wherein providing a suggestion for display on the user device to the viewing user, the suggestion including the one or more particular nodes and the associated particular sub-node further comprises:
retrieving a plurality of content items associated with the particular sub-node; and
providing the retrieved plurality of content items associated with the particular sub-node for display in association with the suggestion.

19. The non-transitory computer readable storage medium of claim 18, wherein the plurality of content items further comprises a plurality of photos uploaded to the social networking system by a plurality of users of the social networking system interacting with the particular sub-node.

20. The non-transitory computer readable storage medium of claim 18, wherein the plurality of content items further comprises a plurality of reviews uploaded to the social networking system by a plurality of users of the social networking system interacting with the particular sub-node.

21. The non-transitory computer readable storage medium of claim 18, wherein the plurality of content items further comprises a plurality of reviews retrieved from an external system outside the social networking system, where the plurality of reviews relate to the particular sub-node.

22. The non-transitory computer readable storage medium of claim 15, wherein the plurality of sub-nodes further comprises a plurality of custom graph objects comprising a plurality of song objects playable through the social networking system using one or more external music streaming services connected to the social networking system, further comprising:
  receiving a selection of the particular sub-node for playing a song object associated with the particular sub-node; and
  responsive to the received selection, sending a request to the one or more external music streaming services connected to the social networking system to play a song corresponding to the selected song object associated with the particular sub-node.

23. The non-transitory computer readable storage medium of claim 22, wherein the plurality of nodes further comprises a plurality of album objects associated with the plurality of song objects, further comprising;
  receiving a selection of a selected node of the one or more particular nodes for playing an album object associated with the selected node; and
  responsive to the received selection, sending a request to the one or more external music streaming services connected to the social networking system to play an album corresponding to the selected album object associated with the selected node.

24. The non-transitory computer readable storage medium of claim 15, wherein generating a plurality of associations between the plurality of sub-nodes and the plurality of nodes further comprises:
  providing a user interface for generating the plurality of associations between the plurality of sub-nodes and the plurality of nodes;
  receiving user input within the user interface, where the user input identifies an association between one or more particular sub-nodes of the plurality of sub- nodes and a particular node of the plurality of nodes; and
  storing the association between the one or more particular sub-nodes and the particular node in the social networking system.

25. The non-transitory computer readable storage medium of claim 24, wherein the user input further comprises an electronic file listing the one or more particular sub- nodes to be associated with the particular node.

26. The non-transitory computer readable storage medium of claim 24, wherein the user input further comprises textual user input identifying one or more particular sub-nodes to be associated with the particular node.

27. The non-transitory computer readable storage medium of claim 24, wherein the user input further comprises an application programming interface call identifying the one or more particular sub-nodes to be associated with the particular node.

28. The non-transitory computer readable storage medium of claim 15, further comprising:
  receiving a request for a targeting cluster from an advertiser, where the targeting cluster includes the particular sub-node as targeting criteria;
  retrieving a plurality of past user interactions with the particular sub-node performed by a plurality of users of the social networking system; and
  providing the plurality of users that performed the plurality of past user interactions with the particular sub-node as the targeting cluster responsive to the request from the advertiser.

29. A system comprising:
a processor; and
a non-transitory computer-readable storage medium coupled to the processor, the computer-readable storage medium having instructions encoded thereon that, when executed by the processor, cause the processor to:
maintain a plurality of nodes in a social networking system, where the plurality of nodes represent a plurality of entities and concepts in the social networking system;
maintain, in the social networking system, a plurality of sub-nodes of the plurality of nodes;
generate a plurality of associations between the plurality of sub-nodes and the plurality of nodes, comprising:
  retrieve a plurality of attributes about a specified node of the plurality of nodes;
  determine a subset of the plurality of sub-nodes matching the plurality of attributes about the specified node; and
  for each sub-node of the determined subset, store an association between the sub-nodes and the specified node in the social networking system;
receive, from a user device associated with a viewing user of the social networking system, information identifying a particular sub-node of the plurality of sub-nodes;
retrieve one or more particular nodes of the plurality of nodes associated with the particular sub-node related to the received information identifying the particular sub-node;
determine, based on the plurality of associations, which of a plurality of users is connected to the viewing user in the social networking system;
determine a number of interactions between the users connected to the viewing user and the particular sub-node;
provide a suggestion for display on the user device to the viewing user, the suggestion including the one or more particular nodes associated with the particular sub-node with the highest determined number of interactions between the users connected to the viewing user and the particular sub-node.

* * * * *